July 23, 1935.  R. D. CONKLIN ET AL  2,009,081
MULTIPLE UNIT TREADLE CONTROLLED DOOR SYSTEM
Filed July 5, 1934   5 Sheets-Sheet 1

INVENTOR
Frank E. Johnson
Roscoe D. Conklin
BY
ATTORNEYS

INVENTOR
Frank E. Johson
Roscoe D. Conklin
BY
Darby & Darby
ATTORNEYS.

July 23, 1935.   R. D. CONKLIN ET AL   2,009,081
MULTIPLE UNIT TREADLE CONTROLLED DOOR SYSTEM
Filed July 5, 1934   5 Sheets—Sheet 5

INVENTOR
Frank E. Johnson
Roscoe D. Conklin
BY Darby & Darby
ATTORNEYS.

Patented July 23, 1935

2,009,081

UNITED STATES PATENT OFFICE 2,009,081

MULTIPLE UNIT TREADLE CONTROLLED DOOR SYSTEM

Roscoe D. Conklin and Frank E. Johnson, Rahway, N. J., assignors to National Pneumatic Company, New York, N. Y., a corporation of West Virginia Application July 5, 1934, Serial No. 733,768

13 Claims. (Cl. 268—34)

This invention relates to improvements in power operated doors, and more particularly with relation to the controlling apparatus for the door operating motor device.

The invention is more particularly concerned with a control system for such a door in which a plurality of treadles are positioned in the passageway to and from the door and cooperate with interconnected electrical devices to control the door in accordance with certain objects of this invention.

A further object of this invention is to provide a system of this nature which is equally effective for correctly operating the doors when approached from either direction.

These and many other objects as will be fully described in the following specification are successfully secured by means of this invention.

This invention resides substantially in the combination, construction, arrangement and relative location of parts in accordance with the following detailed disclosure.

It is at present common practice to provide power operated doors for rooms, offices, buildings, railway stations, vehicles, and the like, in which the door operating power mechanism is controlled by one or more instrumentalities under the influence of persons approaching the doorway. For example, it is common practice on automotive busses to provide electric treadles in the passageway to the rear door of such vehicles so that the presence of a passenger on the treadle is necessary to either complete or initiate the operation of the power mechanism which opens and closes the door. There are likewise now a number of systems of power operated doors in which the initial or complete control of the power mechanism is under the influence of a photo-electric cell mechanism positioned so as to be influenced by the approach of a person to the doorways.

Where the doors controlled in accordance with these and other known systems are the outer doors of a building it has been found from experience that systems as now used hold the doors open longer than is necessary to allow persons to pass therethrough. The result is that the warmer space in the building is subjected to an undue amount of cooling which in accordance with this invention may be materially reduced without interfering with the correct operation and functions of the door system. Likewise, in summer, an air-conditioned space is subjected to undue heating if the doors do not close quickly.

An important object, therefore, of this invention may be stated to be that the control apparatus for the power mechanism is so arranged that immediately a person has passed through the doors they may be closed without further delay. A subsidiary feature of the invention involves the arrangement of the apparatus so that when an approaching person comes within the working range of the doors they begin to open so that when he reaches the doorway they are fully open. As soon as he passes through the doorway the doors begin to close. These and the other objects which will later appear are obtained in a number of ways, all within the general principles of this invention and some of which have been illustrated in the drawings.

Figure 1:
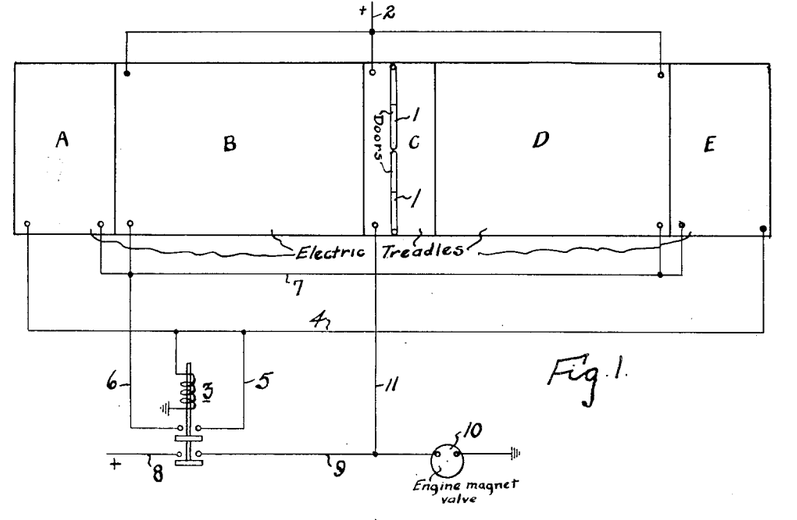
Figure 1 is a diagrammatic view of one form of door control system in accordance with this invention.

In the arrangement of Figure 1 the doors have been diagrammatically illustrated at 1, 1. These doors, in accordance with well known practice, are secured to vertical door shafts which are journalled on vertical axes and rotated by means of motive devices (not shown) so that the doors swing, for example, to the right of Figure 1. These doors have been illustrated as folding doors of the double leaf type in which each door comprises two leaves hingedly connected together at the center so that as the doors open one half of each folds back on the other half.

In accordance with common practice the door motors are controlled by a control device of a nature depending upon the type of motor employed. The invention as disclosed in this application is illustrated as a form using fluid pressure operated engines and the control device 10 is therefore what is known as a magnet valve, of which the magnet valve illustrated in Patent No. 1,786,234, issued December 23, 1930, is an example of a large class. Likewise, as is well known, this valve is commonly used with the differential type of fluid pressure operated engine, in which fluid pressure is continuously supplied to the smaller cylinder and the supply of fluid pressure to and the exhaust from the larger cylinder is controlled by the magnet valve. Thus when the valve is deenergized the fluid pressure is on both cylinders of the engine and the door is closed. When the magnet valve is energized the larger cylinder is cut off from the supply and open to exhaust so that the engine may move the door to open position. This is all well known in the art, but is described so that a complete understanding of the following circuits will be fully appreciated.

Arranged in the passageway of the doors 1, 1 are a plurality of electric treadles A, B, C, D and E. These treadles may likewise be of a number of well known forms but are preferably of the thin, flexible, rubber mat type, of which the structure in Patent No. 1,775,755, issued September 16, 1930, is an example. These rubber mat treadles embody an electric switch therein so that when pressure is applied to the depressible treadle the switch is closed.

As illustrated in Figure 1, the treadle C is mounted directly under the doors 1, 1 so as to project on both sides thereof. It will be noted that this treadle projects more to the right of the doors than it does to the left. The practical purpose of this is, it having been assumed that the doors swing to the right when they open, that they will not begin to close too soon upon a person moving from left to right in order to safeguard him against injury. A person moving from right to left is moving in the direction the doors will close, and hence the treadle need not extend so far to the left of the doors.

Figure 2:
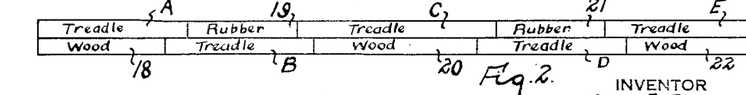
Figure 2 is a diagrammatic view of the relative arrangement of the various treadles employed in the various combinations.

On opposite sides of the treadle C and in alignment therewith are the treadles B, A, D and E. In order to attain the full effectiveness of the present invention the treadles must be arranged in accordance with the diagrammatic illustration in Figure 2. Treadle A overlaps treadle B at one side, and treadle C overlaps treadle B at the other. Likewise, treadle C overlaps treadle D at one edge, and treadle E overlaps treadle D at the other edge. The spaces below treadles A, C and E are filled by wooden or other suitable platforms 18, 20 and 22, respectively, and the spaces above treadles B and D are filled with rubber mats 19 and 21. The purpose of the wooden platforms and the rubber mats is to provide, of course, a smooth, uniform walking surface. The wooden platforms provide a firm foundation for the treadles over them and the rubber mats 19 and 21 provide flexible, depressible surfaces, which when stepped upon will cause the depression of the treadles B and D so that the switches contained therein will be operated. The object of overlapping these treadles in the manner illustrated in Figure 2 is to eliminate any so-called "dead spots".

With the arrangement illustrated it will be apparent that a person stepping at the line of union between treadle A and mat 19, for example, will be sure to make and/or keep the switches of these treadles closed. If the treadles were simply laid in a horizontal plane with abutting edges, the natural construction of them is such that pressure at any joint would not cause the switches of either treadle to close. By experience it has been found that the arrangement illustrated in Figure 2 eliminates the so-called "dead spots". The manner in which this is accomplished will be further appreciated if it be kept in mind that these treadles, of which the above last mentioned patent is an example, are in the form of thin, flexible mats which are readily deformed under pressure.

In the arrangement of Figure 1 a single relay 3 is all that is necessary to control the circuits to the magnet valve 10. This relay is likewise of any well known form, comprising a solenoid winding and contactors movable when the winding is energized to complete circuits to the contacts controlled thereby. One of the contacts of each of the treadles B, C and D is connected to the positive side of the current source through the wire 2. One of the contacts of each of the treadles A and E is connected by wire 4 to one terminal of the solenoid of the relay 3, the other terminal of which is grounded. Wire 4 is also connected by wire 5 to one of the upper pair of contacts of the relay. The other contact of that pair is connected by wire 6 to wire 7, which in turn forms a common circuit for the other contact of each of the treadles A and E and for the other contact of each of the treadles B and D. One contact of the lower pair of the relay is connected to the positive side of current source by the wire 8. The other contact of this pair is connected by wire 9 to one terminal of the solenoid of the magnet valve 10 and by wire 11 to the other contact of treadle C. The other terminal of the magnet valve solenoid is grounded. Of course, the negative side of the current source is permanently grounded.

In the operation of this device, a person approaching the door from the left to the right steps upon treadle A, closing its switch but completing no circuits. However, as the person passes from treadle A to treadle B the switch of treadle B closes and current flows from wire 2 to wire 6, wire 7, switch of treadle A, wire 4, and solenoid of relay 3 to ground. The contactors engage their contacts and a holding circuit is set up from wire 6 through the upper pair of contacts, wire 5, wire 4, and solenoid winding to ground. This circuit is maintained as long as the switch of treadle B is closed. The lower contactor contacts wire 8 to wire 9 energizing the solenoid of the magnet valve and operating it to supply fluid pressure to the door, with the result that the doors begin to open. The doors are fully open by the time the person reaches the doorway. Just as he arrives at the doorway he steps on treadle C, closing its switch and connecting wire 2 to wire 11, with the result that the magnet valve remains energized. As he leaves treadle B its switch opens, deenergizing relay 3, breaking the holding circuit and the circuit to the magnet valve through wires 8 and 9. As soon as he leaves treadle C the direct circuit to the magnet valve through wire 11 is open and the doors begin to close. The treadle C extends to the right enough, however, so that the doors cannot possibly strike him before he moves out of their range. When he steps on treadle D no circuits are completed. However, as he travels from treadle D to E the relay 3 will be momentarily energized but its holding circuit will not be set up because after he leaves treadle D its switch is open so that even if the switch of treadle E is closed the relay will not operate. A similar set of operations occur when a person approaches the door from the right to the left, as will be apparent from the above description, and it is believed that further description of this point is not necessary.

Figure 3:
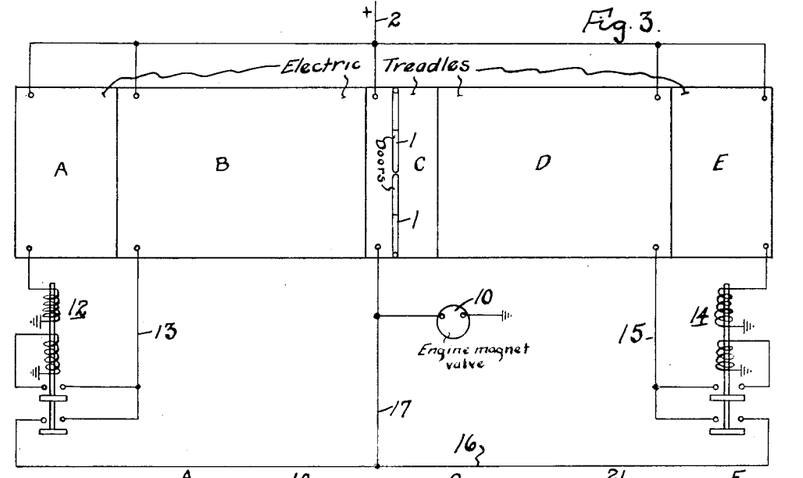
Figure 3 is a diagrammatic view of a modified form of system.

In the system of Figure 3, the door and treadle arrangement is the same. In this case one set of contacts for all of the treadles is connected to the current source through the common conductor 2. The relays 12 and 14 in this case are provided with the upper operating solenoids and the lower holding solenoids. The grounded upper solenoid of each is connected to the other contact of the treadles A and E, respectively. Each relay has two contactors controlling a pair of contacts. One contact of the upper pair is connected to ground through the holding solenoid. The other contact of the upper pair and one of the contacts of the lower pair of each relay are connected by wires 13 and 15, respectively, to the other contacts of the treadles B and D. The remaining contacts of each lower pair are connected by a common lead 16 to the wire 17, which in turn is connected to the magnet valve and to the other contacts of treadle C.

In the operation of this arrangement, a person approaching from the left and stepping upon treadle A closes its switch. Current flows from 2 through the switch of treadle A and to ground through the operating solenoid of relay 12. The relay is thus operated so that its contactors engage the respective contacts. As the person moves on to treadle B current is supplied from 2 through the switch of treadle B to wire 13 through the upper pair of contacts and thence to ground through the holding solenoid. This solenoid, while not strong enough to initially operate the relay, will hold it in operated position. Current also flows from wire 13, through the lower pair of contacts, wire 16, wire 17, and through the magnet valve to ground, energizing the motors to cause the doors to open. As the person moves on to treadle C, current flows directly from wire 2, through the switch of treadle C to wire 17 and thence to ground through the magnet valve, holding it energized until the person moves off of treadle C. Stepping onto treadle D, no circuits are completed, and the door closes. In passing from D to E the operating solenoid of relay 14 is momentarily energized but is not fully operated nor held operated because the switch of treadle D is open.

Figure 4:
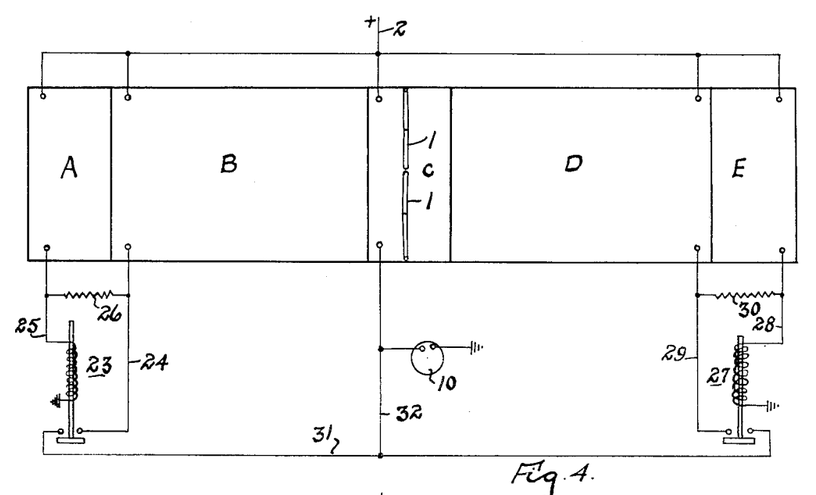
Figure 4 is a similar view of a further modification.

In the system of Figure 4, the door and treadle arrangements are the same as before. One contact of each of the treadle switches is supplied with current from the common conductor 2. A pair of single coil relays 23 and 27 are employed. The winding of relay 23 is energized to ground through the conductor 25 connected to the other contact of the switch of treadle A. In a similar way the winding of relay 27 is energized to ground through the conductor 28 and the switch of treadle E. Each relay has a single contactor controlling a pair of contacts. One contact of relay 23 is connected by wire 24 to the other contact of the switch of treadle B, and one contact of relay 27 is connected by wire 29 to the other contact of the switch of treadle D. The remaining contacts of the relays are connected by a common conductor 31, which in turn is connected by wire 32 to the magnet valve 10 and the other contact of the switch of treadle C. Wires 25 and 24 are interconnected by a holding resistance 26 and likewise wires 28 and 29 are interconnected by a holding resistance 30.

It is, of course, apparent that the holding resistance 26 as used in this modification may be used in the other illustrated circuits employing holding coils and in place thereof.

In the operation of this arrangement, a person stepping on treadle A energizes the solenoid of relay 23 from 2 through the switch of treadle A, wire 25, and the winding to ground. The relay thus closes the circuit controlled thereby. When the person steps on treadle B a holding circuit is provided through resistance 26. Thus current flows from 2 to the switch of treadle B, wire 24, resistance 26, wire 25, and then to ground through the relay winding. Thus the relay remains operated, although the current supplied through the resistance would not be sufficient to initially operate it. Current also flows from wire 24 through the relay switch, wire 31, wire 32 and magnet valve to ground. The doors then open. As the person steps on treadle C and leaves B, the magnet valve remains energized through the switch of treadle C. When the person leaves treadle C the door closes as before. In stepping on treadle D current will be supplied to the winding of relay 27 but through resistance 30 so that the relay will not operate. As he steps on treadle E the winding of relay 27 will be energized but the relay will be energized for such a short time that the doors, while they may slightly tend to open, will not open.

At this point it may be well to point out, as indicated in the drawings, that the terminal treadles A and E in the arrangement of the figures already described and to be described are relatively narrow in the direction of the passageway. They are only wide enough so that they may not be stepped over by a person but must be stepped upon with at least one foot. Thus these treadles may be proportioned so that in approaching them from either direction they will only receive the pressure of one foot and hence the switches thereof will only be momentarily closed. By way of example, these treadles may be approximately three feet wide in the direction of the passageway. The treadles B and D are preferably approximately five feet in the direction of the passageway, and treadle C is preferably about two and a half feet wide in the same direction. The treadle C projects to the left of the door about a foot, and to the right about a foot and a half. With these proportions the treadle-way is long enough on each side of the door to allow the doors the correct time to fully open by the time a normally moving person reaches the doorway.

Figure 5:
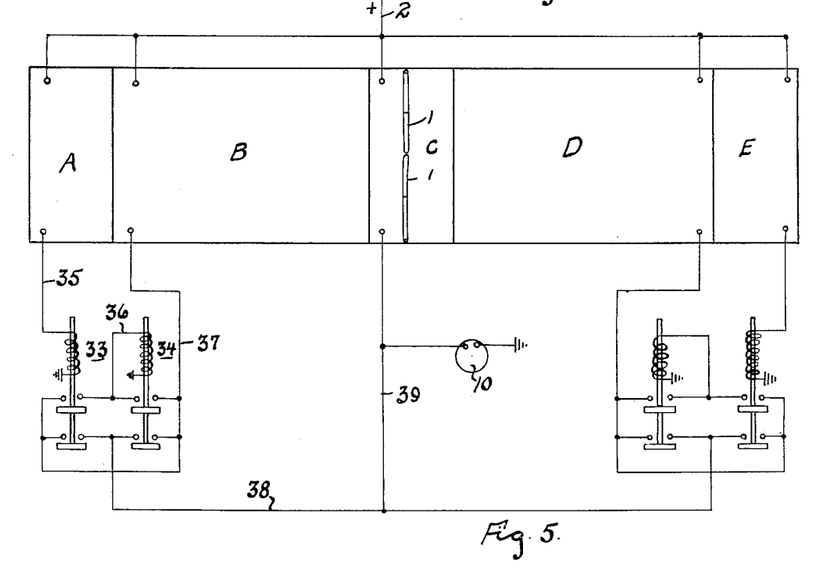
Figure 5 is a similar view of another modification.

In the arrangement of Figure 5, the treadles and doors are as before. The live contact of each switch of the treadles is energized from the common conductor 2. In this case the pair of relays are provided for each end of the treadle-way. Since, as has been apparent from the previous descriptions with the exception of the arrangement of Figure 1, the apparatus is the same at both ends, it will not be necessary to describe in detail the connections as they are duplicates. In this arrangement relays 33 and 34 are provided. Each relay has two contactors, each controlling a pair of contacts. The winding of relay 33 is connected to the other contact of the switch of treadle A by wire 35. One contact of each upper pair of contacts of the relays is connected through wire 36 to the grounded winding of relay 34. The remaining contact of the upper pair of the relay 34 and one contact of the lower pair are connected by wire 37 to the other contact of the switch of treadle B and to one contact of each pair of the other relay. The remaining contact of each lower pair of both relays is connected by wire 38 to wire 39, which in turn is connected to the magnet valve 10 and the other contact of the switch of treadle C.

In the operation of this arrangement, a person stepping upon treadle A supplies current from 2 through the switch of treadle A, wire 35, and thence to ground through the winding of relay 33. The contactors of this relay engage their respective contacts. As the person is passing from treadle A to treadle B current flows from 2 through the switch of treadle B, wire 37, the upper contactor of relay 33, and thence to ground through wire 36 and the winding of relay 34. Current also flows through the lower contactor of relay 33, wire 38, wire 39, and magnet valve 10. The doors begin to open. As the person leaves treadle A, relay 33 is deenergized, but relay 34 is held energized through the switch of treadle B. Likewise, the circuit to the magnet valve through wire 38 is maintained through the lower contactor of relay 34. When the person leaves treadle B relay 34 is deenergized but the magnet valve is maintained energized through the switch of treadle C. In stepping upon treadle D no circuits are completed. However, in passing from treadle D to treadle E and off of treadle E, the relays are given a momentary impulse of such short duration that the doors are not operated. The same operations occur when the door is approached from the opposite side.

Figure 6:
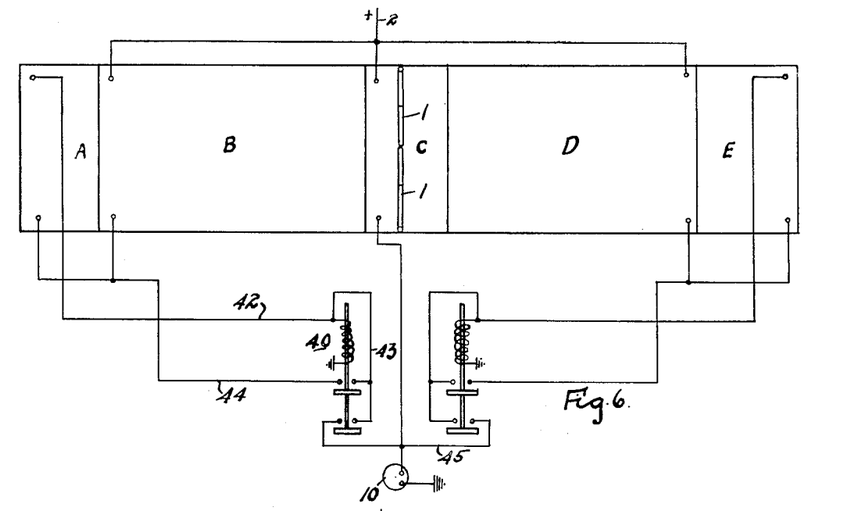
Figure 6 is a diagrammatic view of a still further modification.

In the arrangement of Figure 6, but one relay is employed for each side of the door. The doors and treadles are as before. One contact of the switches of each of the treadles B, C and D is energized from the common wire 2. The winding of relay 40 is connected by wire 42 to one contact of the switch of treadle A. Its other contact, as well as the other contact of the switch of treadle B, is connected by wire 44 to one of the upper contacts of relay 40. Wire 42 is connected by wire 43 to one contact of each pair of contacts. The remaining contact of the lower pair is connected by wire 45 to the magnet valve and to the other contact of the switch of treadle C.

In the operation of this arrangement, the person's presence on treadle A does not complete any circuits. However, in passing from treadle A to B, current flows from 2 through the switch of treadle B to wire 44, switch of treadle A, wire 42, and relay 40 to ground. A holding circuit is set up through wire 44, the upper pair of contacts and wire 43. Current also flows from wire 43 through the lower pair of contacts, wire 45, and the magnet valve to ground. As before, when the switch of treadle C is closed a direct circuit is completed to the magnet valve. As the person leaves treadle B, its switch opens, breaking the circuit to the relay 40. The operation of the apparatus from the other end is similar.

Figure 7:
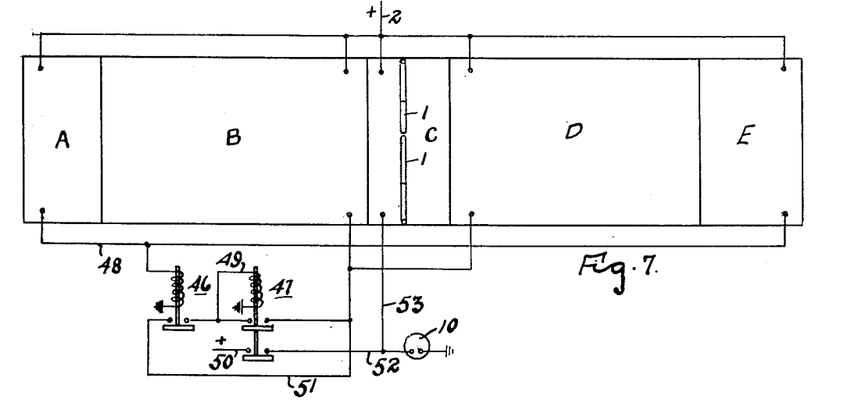
Figure 7 is a diagrammatic layout of still another modification.

In the arrangement of Figure 7, the doors and treadles are as before. In this case one contact of the switch of each treadle is supplied from the common wire 2. The other contact of the switch of treadles A and E are connected by wire 48 to the grounded winding of the relay 46. The grounded winding of relay 47 is connected by wire 49 to one contact of the relay 46 and to one contact of the upper pair of the relay 47. The other contact of relay 46 and the other contact of the upper pair of relay 47 are connected by wire 51 to the dead contacts of switches of treadles B and D. One contact of the lower pair of relay 47 is connected to the current source by wire 50 and the other contact of this pair is connected by wire 52 to the magnet valve 10 and by wire 53 to the dead contact of the switch of treadle C.

In the operation of this arrangement pressure on treadle A supplies current from 2 through the switch of treadle A, wire 48, and the winding of relay 46. In passing from treadle A to B current flows from 2 through the switch of treadle B, wire 51, contacts of relay 46, wire 49, and the winding of relay 47 to ground. The contactors of relay 47 complete a holding circuit for that relay through the upper pair of contacts and wire 49. A circuit for the magnet valve is completed from the wire 50 through the lower pair of contacts and wire 52 to the magnet valve. In leaving treadle A relay 46 is deenergized. As before, pressure on treadle C provides a direct circuit to the magnet valve and when treadle B is relieved relay 47 is deenergized. Here again a similar operation occurs in approaching the treadle from the opposite direction.

Figure 8:
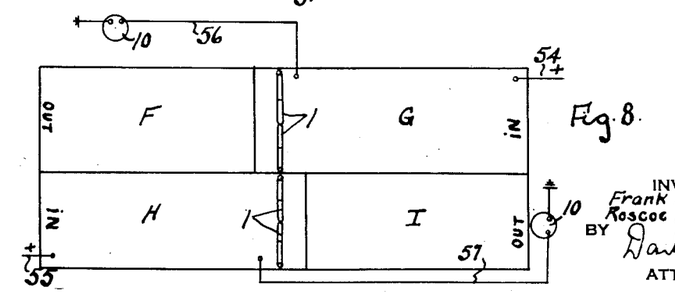
Figure 8 is a diagrammatic view of a simplified modification.

In Figure 8 is a very simplified arrangement in which two pairs of doors 1 are employed. Thus persons moving from the right to left pass over the treadle G and mat F and in moving from left to right pass over the treadle H and mat I. The switch of treadle G has one contact energized from the wire 54. Its other contact is connected to the magnet valve 10 by the wire 56. Similarly, one contact of the switch of treadle H is connected to the current source by wire 55. The other contact is connected by wire 57 to the other magnet valve 10. In this case, of course, there are two fluid pressure engines, one for operating one pair of doors and the other for operating the other pair of doors, and each controlled by one of the magnet valves. In approaching the doors from right to left, a person stepping on treadle G closes its switch and energizes the magnet valve 10 for the corresponding pair of doors, causing them to open and holding them open until he leaves treadle G and passes onto mat F. A similar operation occurs in passing the doors from left to right along the treadle H and mat I.

Figure 9:
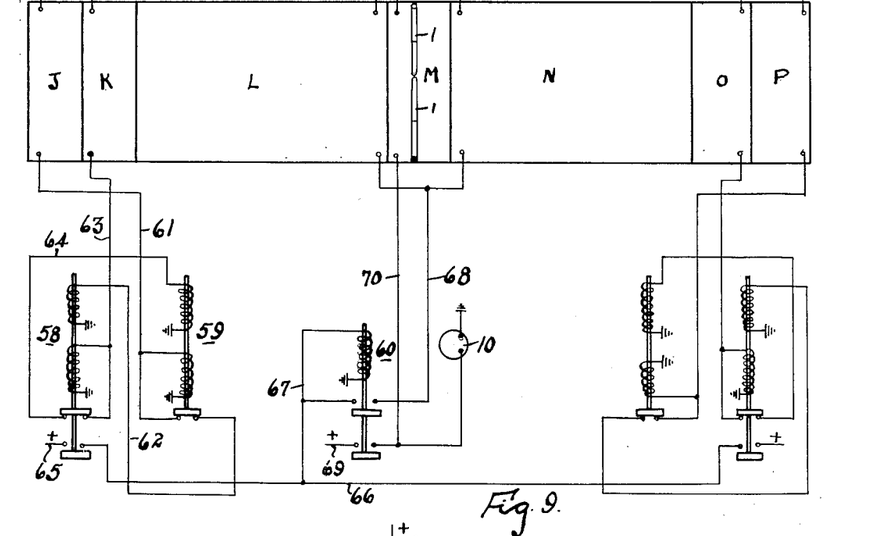
Figure 9 is a diagrammatic layout of a more involved modification.

The arrangement of Figure 9 employs the same treadleway for movement of persons in both directions and a single pair of doors 1, 1. In this case, however, two more treadles are employed than are used in the systems of Figures 1, 3, 4, 5, 6 and 7. These treadles have been illustrated as J, K, L, M, N, O and P. The treadles J and K and O and P take the place of the treadles A and E of the previously described systems. The treadles L, M and N are similar to treadles B, C and D of the previously described systems. The relays 58, 59 and 60, in this case, are employed for one end, and relay 60, in conjunction with a pair of relays at the other end similar to the relays 58 and 59, is employed for the other end. The other contact of the switch of treadle J is connected by wire 61 to the lower holding winding of relay 59 and to one of the contacts controlled thereby. The other contact of this relay is connected by wire 62 to the operating winding of relay 58. The holding winding of relay 58 is connected by wire 63 to the other contact of the switch of treadle K. This wire also connects to one contact of the upper pair of the relay 58. The other contact of this pair is connected by wire 64 to the operating winding of relay 59. One contact of the lower pair of relay 58 is connected to the current source by wire 65. The other contact is connected by wire 66 to wire 67 which extends to the operating coil of relay 60 and to one contact of its upper pair. The other contact of this pair is connected by wire 68 to the other contacts of the switches of treadles L and N. One contact of the lower pair of relay 60 is connected to the current source by wire 69. The other contact is connected to the magnet valve 10 and by wire 70 to the other contact of the switch of treadle M.

In the operation of this system, when a person steps on treadle J current flows from 2 through the switch of treadle J, wire 61, and the lower holding winding of relay 59. The holding winding, although energized, is not sufficient to operate the relay which remains in its normally closed position. Current does flow, however, through this closed switch and wire 62 to the operating coil of relay 58. The upper pair of contacts are disconnected and the lower pair connected so that current flows from 65 through the lower pair of contacts, wire 66, wire 67, and winding of relay 60. The relay is operated to connect the current source through wire 69, the lower pair of this relay, and thence to ground through the magnet valve causing the doors to begin to open. As the person steps on treadle K current flows from 2 through the switch of treadle K, wire 63, and to ground through the holding coil of relay 58, holding it in operated position even though the switch of treadle J opens as the person moves therefrom. The person then moves onto treadle L so that current flows from 2 through the switch of that treadle, wire 68, the upper contacts of relay 60, and by way of wire 67 to ground through the winding of that relay. Thus the relay is maintained operated and the circuit for the magnet valve is held closed. A similar circuit is set up through the switch of treadle M as the person moves onto it. As soon as the person leaves treadle M relay 60 is deenergized and the magnet valve is returned to the position to cause the motor to close the doors. The feature of this arrangement is in that a person moving from the right to the left and in stepping upon treadle K does not cause even a momentary energization of the magnet valve. Thus, in going in the reverse direction and in passing from treadle L to treadle K, the circuit to the holding winding of relay 58 is closed but the relay is not operated since the winding is not strong enough to initially operate it. Hence, current also flows from the wire 63 of the holding winding circuit through the upper pair of contacts to wire 64 and to ground through the operating winding of relay 59. The result is that when the person steps on treadle J the circuit to the operating coil of relay 58 is broken by the relay 59. As the person's weight entirely shifts from treadle K to treadle J the operating winding of relay 59 is deenergized, but its holding winding remains energized through wire 61. The result is that in going in the reverse direction the magnet valve is not even momentarily energized.

Figures 10, 11:
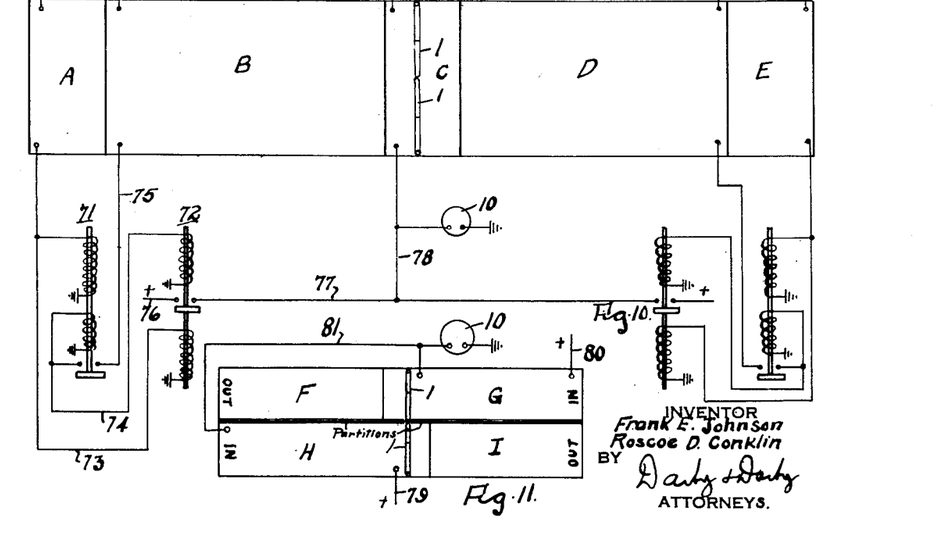
Figure 10 represents a still further modification.
Figure 11 is a diagrammatic view of an exceedingly simplified modification.

The system of Figure 10 is like that of the earlier figures in that it employs but five treadles. The upper contacts of the switches of these treadles are energized from the common source 2. The lower contact of the switch of treadle A is connected by wire 73 to the operating winding of relay 71 and to the lower winding of relay 72. The upper winding of relay 72 is connected by wire 74 to the holding winding of relay 71 and to one of the contacts controlled thereby. The other contact for this relay is connected by wire 75 to the switch of treadle B. One of the contacts of the relay 72 is connected by wire 76 to the current source. Its other contact is connected by wire 77 to wire 78, which in turn is connected to the magnet valve 10 and the switch of treadle C.

In the operation of this system, when a person steps on treadle A current flows from 2 through the switch of that treadle, wire 73 and winding of relay 71 to ground. The relay is then operated. As the person passes onto treadle B current flows through the switch thereof and through the closed switch of relay 71 to ground through the holding winding thereof, maintaining the relay operated even after the switch of treadle A opens. Current also flows from wire 75 through wire 74 and the upper winding of relay 72 to cause it to operate. The circuit is then completed from 76 through relay 72, wire 77, wire 78, and magnet valve 10. As before, a direct circuit through the switch of treadle C is made when the person reaches that treadle. When treadle A is left the circuit to the operating coil of relay 71 is broken and when treadle B is left the holding circuit for that relay is broken. Here again the feature of this system is that movement in the reverse direction over these treadles does not cause even a momentary energization of the magnet valve. Thus in moving to the left from treadle C onto treadle B no circuit is made since relay 71 is deenergized. In stepping from treadle B to treadle A the circuit to the relay 71 is made and the relay operates. At the same time, however, the lower coil of relay 72 is energized through wire 73 and this winding is strong enough so that although the upper winding of 72 is energized the relay does not operate because the lower winding prevents it. It might be noted for sake of clarity in connection with both systems of Figures 9 and 10 that the description of the operation when a person is moving from the right to the left only applies to the operation of the system when the person moves from treadle C to treadle B and then to treadle A. Of course, that person, in arriving at that point and moving over treadles E and D, will cause the system to operate as before through the relays at that end.

The exceedingly simplified system of Figure 11 again employs two passageways over which traffic always moves in the same direction. A pair of doors 1 are employed and for the passageways the treadles G and H and the mats are employed. The treadles G and H extend in the direction of movement of traffic thereover beyond the doors a sufficient distance so that they will not begin to close before the person has moved out of their range. The switch of treadle G is energized at one contact through wire 80 and the switch of treadle H is energized at one contact through wire 79. The other contacts of both switches are connected by the common wire 81 to the magnet valve 80, which, in this case, controls the motor which operates both doors. Thus a person moving in either direction and stepping on treadles G or H provides a direct circuit either from wire 80 or wire 79 to the magnet valve to cause the doors to open. They begin to close as soon as the person moves from treadle G to mat F or from treadle H to mat I.

With this arrangement it is desirable that a partition or railing extend longitudinally of the passageways between the treadles and mats from the outer ends to the doors, to keep the lanes of traffic properly separated.

Figure 12:
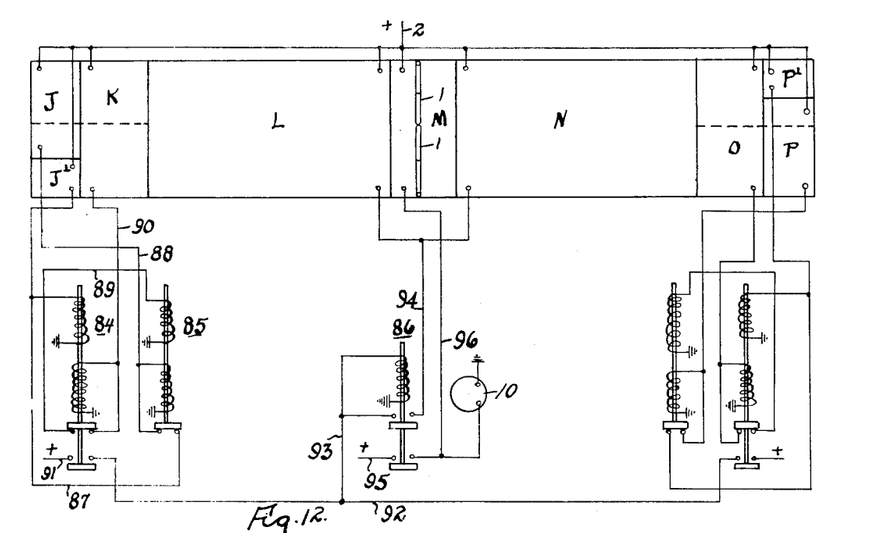
Figure 12 is a diagrammatic layout of another system in accordance with the principles of this invention.

In the system of Figure 12, which is somewhat similar to the system of Figure 9, it will be noted that the treadles J and F are divided into two treadles providing the smaller treadles J' and F'. The purpose of this arrangement is to insure correct operation of the system under all conditions normally encountered, as for example, when one person is moving from right to left and is at treadles K and J and when a person is moving from left to right and is at the same place. In this case, the first treadles are preferably provided with a white line or other indicating mark at approximately the center of the treadle-ways, as indicated by the dotted lines in the figure, so that the passing traffic will naturally keep to its proper side. The upper contact of each switch of each treadle is energized from the common wire 2. The other contact of the switch of treadle J is connected by wire 88 to the holding winding of relay 85 and to one of the contacts controlled thereby. The other contact is connected by wire 87 to the operating winding of relay 84 and to the other contact of treadle J'. The other contact of treadle K is connected by wire 90 to the holding winding of relay 84 and to one of the contacts of the upper pair. The other contact is connected by wire 89 to the operating winding of relay 85. One contact of the lower pair of relay 84 is connected to the current source by wire 91 and the other contact is connected by wire 92 to wire 93, which in turn connects to the grounded operating winding of relay 86 and to one of the contacts of the upper pair thereof. The other contact is connected by wire 94 to the dead contacts of the switches of treadles L and N. One contact of the lower pair of the relay 86 is connected to the current source by wire 95. The other contact is connected to the magnet valve 10 and by wire 96 to the dead contact of the switch of treadle M.

A person moving from left to right and naturally keeping on the right side of the white line, or sufficiently so that he will step on treadle J', closes a circuit from 2 through the switch of treadle J', wire 87, and operating winding of relay 84. If, however, he steps on treadle J, current will flow from 2 through the switch of treadle J, wire 88, contacts of relay 85, wire 87, and thence to ground through the operating coil of relay 84. This relay is thus operated to break the circuit at its upper pair and to complete the circuit at its lower pair. Current then flows from 91 through the lower contacts of relay 84, wire 92, wire 93 and the winding of relay 86. This relay is operated to close the circuits controlled thereby so that current flows from 95 to the magnet valve. When the person steps on treadle K, current flows through wire 90 and the holding winding of relay 84 to maintain it operated. In passing from treadle K to treadle L the holding circuit for the winding of relay 86 is completed through wire 94 and, as before, a direct circuit is made to the magnet valve through the switch of treadle M when closed. A person moving from right to left and passing from treadle L to treadle K completes a circuit through wire 90 to the holding winding of relay 84 which is not operated. A circuit is also completed through the upper contacts of this relay, wire 89 and the operating winding of relay 85 to operate it. Its operation breaks the circuit to the operating winding of relay 84 in an obvious manner so that when treadle J is stepped upon the magnet valve is not energized.

In this case it is assumed that the person moving from right to left will stay on his side of the white line. In passing from treadle K to treadle J a holding circuit in relay 85 is made through the wire 88.

An important feature of this arrangement, it will be noted, is that if at the time the person moving from right to left is on treadle K or treadle J, or both, and a person moves from left to right, he may cause the doors to open for him. When he steps on treadle J' a direct circuit is made to the operating winding of relay 84 so that a circuit to the magnet valve is set up. It does not matter, should the passing persons not follow the natural course of keeping to the right but reverse their position in passing, since the treadles J and J' will be operated to set up the same circuits to the door. It will be noted that this is the distinction over the arrangement of Figure 9 where if relay 59 has been opened by a person moving from right to left and a person moves from left to right onto the treadle J the magnet valve cannot be energized because the circuit to the operating coil of relay 58 is broken.

Figure 14:
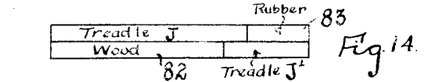
Figure 14 is a diagrammatic layout of the end treadle arrangement of Figure 12.

The arrangement of the treadles J and J' at the end of the gangway is shown in Figure 14. These treadles overlap transversely, as indicated in the figure, and in a manner similar to the longitudinal overlap of the treadles, as illustrated in Figure 2. In this case the treadle J is supported upon a wooden or similar platform 82 and overlaps the treadle J' which has on the top thereof the rubber mat 83 to provide a uniform marking surface. Thus there is no dead spot between treadles J and J' in accordance with previously described principles. It might be advisable to reiterate here that in all of the treadle systems disclosed the treadles overlap, as indicated in Figure 2, to eliminate the possibility of any dead spots at treadle joints. It might also be noted that the treadle arrangement of Figure 14, as shown for treadles J and J', is likewise employed for the treadles P and P'.

Figure 13:
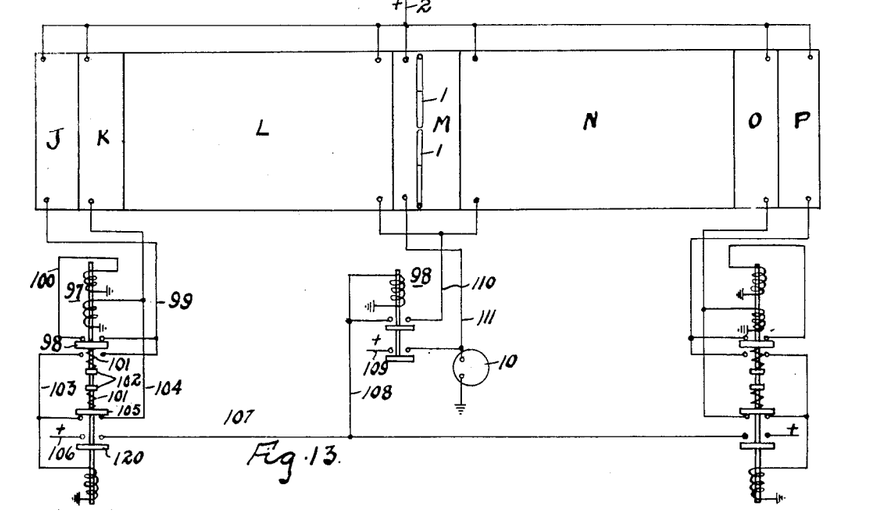
Figure 13 is a still further modified form.

A somewhat different arrangement is employed in Figure 13 but the treadle system is like that of Figure 9, for example. The live contact of each switch of each treadle is supplied from the common source 2. The lower contact of the switch of treadle J is connected by wire 99 to one contact at each of the upper two pairs of the relay 97. The other contact of the uppermost pair is connected by wire 100 to the topmost operating coil of the relay. The other contact of the next lower pair is connected by wire 103 to one contact of the next lower pair and to the lowermost winding. The dead contact of the switch of treadle K is connected by wire 104 to the holding winding of the relay and to the other contact of the third lowest pair. One contact of the lowermost pair is connected to the current source by wire 106 and the other contact is connected by the wire 107 to the wire 108, which in turn connects to the winding of relay 98 and to one contact of the upper pair thereof. The other contact of this pair is connected by wire 110 to the dead contact of each of the switches of treadles L and N. One contact of the lower pair of relay 98 is connected by wire 109 to the current source. The other contact is connected to relay 10 and by wire 111 to the dead contact of switch M. The construction of relay 97 is of a well known type and of a nature in which the contact arms 98 and 105 are slidably mounted on the supporting shaft. They are engaged by springs 101, each of which rests against collars 102 locked to the shaft. The contact arm 120 is locked to the operating shaft. When the relay is in a normal position as shown, arm 98 engages the uppermost pair of contacts and arm 105 engages the adjacent contacts, as shown.

In the operation of this system, when a person steps on treadle J current flows from 2 through the switch of treadle J, wire 99, arm 98 and its contacts, wire 100 and the operating coil of relay 97. The relay is thus energized so that arm 120 engages its contacts, and arm 105 moves away from its contacts since its movement towards them on the shaft is limited in accordance with well known practice by a stop. However, arm 98 retains its engagement with its contacts. Current then flows from 106 through 120 to wire 107 and then through wire 108 to ground through the operating winding of relay 98. This relay is operated to supply current from wire 109 to the magnet valve. As the person steps on treadle K current flows through wire 104 to the holding winding of relay 97, which is the middle winding, maintaining the circuits as before. When the person steps on treadle L a holding circuit for the winding of relay 98 is set up through wire 110. For a reverse movement of a person from treadle M to treadle L no circuits are set up. However, as he steps on treadle K current flows through wire 104, arm 105 (the relay, of course, being deenergized), and then through wire 103 to the lowermost winding of relay 97 so that the shaft is pulled down, causing contact arm 98 to engage the lowermost contacts and maintaining arm 105 in engagement with its contacts, it being able to slide on the shaft. Thus the circuit through wire 104 and arm 105 to the lowermost winding is retained. As the person shifts over to treadle J and its switch is closed, no current flows to the upper operating winding of the relay because its circuit is broken at arm 98. However, current does continue to flow from wire 99 through arm 98, which is now in engagement with the adjacent lower pair of contacts, so that the lowest winding is maintained energized through wire 103. Thus with this system the magnet valve is not momentarily energized for reverse movement of traffic.

From the above description, it will be apparent that this invention resides in certain principles which may be embodied in many physical forms and we do not, therefore, wish to be strictly limited to the disclosure as given for purposes of illustration but rather to the scope of the appended claims.

What we seek to secure by United States Letters Patent is:

1. In a system for controlling a door operated by a motive device, the combination comprising at least five treadles arranged end to end to form a passageway, a control device for each treadle operated by pressure thereon, a power operated control device for controlling the door motive devices, and means interconnecting the treadle control devices and the motor control device so that the motor control device is first prepared for and then energized and maintained energized by a person walking along the treadles and successively depressing them to the door in either direction.

2. In a system for controlling doors operated by motive devices, the combination comprising at least five treadles arranged end to end to form a passageway, a control device for each treadle operated by pressure thereon, a power operated control device for controlling the door motive devices, and means interconnecting the treadle control devices and the motor control device so that the motor control device is energized and maintained energized by a person walking along the treadles to the door in either direction, the power control device being deenergized when the person leaves the central treadle in moving in either direction.

3. The combination for controlling a door operating motive device, comprising movable doors, a plurality of treadles laid end to end in the passageways leading to the doors with one of said treadles mounted under the doors, a control device in each treadle operated by pressure thereon, a power operated control device for the door motive device, and means interconnecting the treadle control devices with the power operated device whereby pressure on the first treadle at either end initially prepares the power operated control device for energization and pressure on the next treadle from either end completes the energization of the power control device.

4. In a combination in which doors are operated by motors, a plurality of treadles laid end to end in the passageways to the doors, a pair of doors mounted over the central treadle, a switch in each treadle operated by pressure on the treadle, a magnet valve for controlling the door motor, and circuits including all of the treadle switches and the magnet valve and a relay whereby pressure on either end treadle will energize the relay which in turn energizes the magnet valve when the succeeding treadle is depressed.

5. In a system for operating doors with motors, the combination comprising at least five treadles laid end to end and each having an electric switch therein operated when the treadle is depressed, movable doors supported above the central treadle, a magnet valve for controlling the door motor, and circuits including the treadle switches, the magnet valve and a relay whereby pressure on the treadle at either end will operate the relay, and pressure on the next treadle at either end will maintain the relay energized and complete a circuit to the magnet valve through the relay.

6. In a system for operating doors with motors, the combination comprising at least five treadles laid end to end and each having an electric switch therein operated when the treadle is depressed, movable doors supported above the central treadle, a magnet valve for controlling the door motor, and circuits including the treadle switches, the magnet valve and a relay whereby pressure on the treadle at either end will operate the relay, which in turn energizes the magnet valve, and pressure on the next treadle at either end will maintain the relay energized, the pressure on the central treadle establishing a direct circuit to the magnet valve.

7. In a system for operating doors with motors, the combination comprising at least five treadles laid end to end in a passageway, doors movably supported above the central treadle, a switch in each treadle arranged to be closed when the treadle is stepped upon, a magnet valve for controlling the door motor, and circuits including the treadle switches and the magnet valve and a relay whereby pressure on either end treadle will energize the relay and partially complete a circuit to the magnet valve, and pressure on the next treadle from either end will maintain the relay energized and complete the circuit to the magnet valve.

8. In a system for controlling doors operated by motors, the combination comprising a plurality of treadles laid end to end in a passageway, doors in said passageway positioned so that the treadles must be stepped upon in approaching the doors from either side, a switch in each treadle arranged to be operated by pressure on the treadle, a magnet valve for controlling the door motor, circuits including said switches, magnet valve and a plurality of relays, pressure on either end treadle energizing one relay and partially completing a circuit to the other relay, and pressure on the next treadle from either end completing the circuit to the second relay, which in turn completes a circuit to the magnet valve.

9. In a control system for door operating motors, the combination comprising a plurality of treadles arranged end to end in a passageway, doors movably supported approximately at the center of said treadles, a switch in each treadle operated by pressure thereon, a magnet valve for controlling the door motor, relays, circuits including said switches, relays and magnet valve, whereby a person approaching the doors from either end and moving over the treadles in succession will energize the relays, which in turn energize the magnet valve to cause the doors to open, and means in said circuits for maintaining the magnet valve circuit open when a person moves over the treadles in succession from the doors towards either end.

10. In a system for controlling the motive device of power operated doors, the combination comprising a control device for the door motive device, and means for controlling the control device, including a plurality of treadles, and means operated thereby, whereby the door motor will be energized as a person moves over the treadles from one end to the other so that the doors are fully open when he reaches the doors and will be deenergized as soon as he passes through the doors and leaves the treadle thereat, and means for preventing the energization of the control device as a person moves from the doors and over the treadles at that side.

11. In a power operated door system, the combination comprising a plurality of individual treadles arranged end to end to form a passageway leading to and from the door, a control device for and operated by the depression of each treadle respectively, a relay in circuit with said control device, a motive device for operating the door, control means connected to the motive device for operating it and circuits including the relay and the control means connected to the motive device whereby the operation in succession of a pair of end treadles by a person moving towards the door first energizes the relay and then the control means connected to the motive device while the operation of the treadles in succession by a person moving from the door does not energize the control means connected to the motive device.

12. In a door control system the combination comprising a door, a motive device connected thereto for operating it, a plurality of individual treadles arranged end to end on either side of the door, a switch for each treadle operated thereby when the corresponding treadle is depressed, a relay, circuits connecting the relay with said switches, an electro-magnetic device connected to the motive device for controlling the operation thereof, and circuits including the electro-magnetic device and the relay, whereby movement of a person over the treadles towards the door causes the motive device to open the door while movement of a person over the treadles from the door does not cause the motive device to open the door.

13. In a door system the combination comprising a door, a sectionalized treadle mounted in the passageway of the door and disposed on each side of the door, and means controlled by the treadle sections for causing the door to open only when a person approaching the doors moves over the treadle sections in succession, but which will not cause the doors to open when a person moves away from the door over the treadle sections in succession, the doors closing if open.

FRANK E. JOHNSON.
ROSCOE D. CONKLIN.